United States Patent [19]

Nobusawa

[11] 3,712,190

[45] Jan. 23, 1973

[54] AUTOMATIC EXPOSURE CONTROLS FOR CAMERAS

[75] Inventor: Tsukumo Nobusawa, Tokyo, Japan

[73] Assignee: Asahi Kogaku Kogyo Kabushiki Kaisha, Tokyo-to, Japan

[22] Filed: Nov. 24, 1971

[21] Appl. No.: 201,743

[30] Foreign Application Priority Data

Dec. 7, 1970 Japan ............................45/107651

[52] U.S. Cl. ..............................95/10 CT, 95/53 EA

[51] Int. Cl. ............................G03b 7/08, G03b 9/62

[58] Field of Search .........................95/10 CT, 53 EA

[56] References Cited

FOREIGN PATENTS OR APPLICATIONS 2,062,606 7/1971 Germany............................95/10 CT

*Primary Examiner*—Samuel S. Matthews
*Assistant Examiner*—Russell E. Adams, Jr.
*Attorney*—Steinberg & Blake

[57] ABSTRACT

A camera having circuitry for automatically determining exposure of film in the camera. The circuitry includes a photosensitive element for receiving light from the object to be photographed and for converting the light into a corresponding electrical signal which varies according to a geometric progression. The signal is stored by a capacitor in the form of a voltage which varies according to an arithmetic progression. A logarithmically operating structure which includes at least one diode is electrically connected between the photosensitive element and the capacitor for converting the geometrically varying signal from the photosensitive element into the arithmetically varying signal stored as a voltage by the capacitor and for reconverting the signal stored at the capacitor into a geometrically varying signal which corresponds precisely to that of the photosensitive element, this logarithmetically operating structure functioning to convert the signal stored at the capacitor into the geometrically varying signal in precisely the same way that the signal was initially converted from the geometrically varying signal of the photosensitive element into the arithmetically varying signal stored as a voltage by the capacitor. An oscillating circuit receives the signal from the capacitor after it has been converted back into a signal varying according to a geometric progression by the logarithmetically operating structure, and this oscillating circuit drives shutter-operating structure which operates to open and close the shutter in accordance with the frequency of pulses of the oscillating circuit, this latter frequency being determined by the signal derived from the capacitor.

7 Claims, 5 Drawing Figures

INVENTOR
TSUKUMO NOBUSAWA
BY
Steinberg and Blake
ATTORNEYS

INVENTOR
TSUKUMO NOBUSAWA
BY
Steinberg and Blake
ATTORNEYS

PATENTED JAN 23 1973

3,712,190

INVENTOR
TSUKUMO NOBUSAWA
BY
Steinberg and Blake
ATTORNEYS

AUTOMATIC EXPOSURE CONTROLS FOR CAMERAS

BACKGROUND OF THE INVENTION

The present invention relates to cameras.

More particularly, the present invention relates to automatic controls for determining the exposure of film in a camera.

The present invention relates particularly to that type of camera which has a photosensitive element for receiving light from the object to be photographed and producing from this light a corresponding electrical signal which is converted into an electrical quantity which is stored so as to be available for use in determining the operation of a shutter which determines the exposure time.

The light received by the photosensitive element of a camera to be converted into a corresponding electrical signal produces a signal which varies according to a geometric progression. This signal is stored as a voltage by a capacitor, with the signal stored by the capacitor varying according to an arithmetic progression. When this latter stored signal is used to determine the exposure time, it is reconverted back into a signal which varies according to a geometric progression. The operating curves of the electrical structures used for these operations are not linear throughout their entire range of operation. Thus, when dealing with extremely short or extremely long exposure times, the variation in the operation is not linear, and therefore particularly under these latter conditions inaccuracies are unavoidably encountered. This latter problem is intensified by the fact that the electrical components used first for transmitting the signal to a capacitor to be stored thereby and then for transmitting the stored signal from the capacitor to the shutter controlling structure are of different operating characteristics, thus increasing the extent of the inaccuracies which are encountered.

The problems encountered with the known structures are increased further by the fact that when dealing with extremely short exposure times, the shutter structure operates mechanically so that the actual start of the opening of the shutter is extremely difficult to control in a highly precise manner and thus the extent to which there is an error in the exposure time becomes undesirably large.

SUMMARY OF THE INVENTION

It is accordingly a primary object of the present invention to provide circuitry which will avoid the above drawbacks.

In particular, it is an object of the present invention to provide for a camera an electrical control structure which will operate in such a way that a stored signal is converted for shutter-operation precisely into the form which it had before it was stored, so that even when dealing with non-linear operating characteristics a high degree of precision is achieved.

Another object of the present invention is to provide an electrical structure which will achieve this latter object with a minimum number of components which operate very reliably.

Furthermore, it is an object of the present invention to provide an electrical structure which will be capable of achieving exposure times of very short duration with a high degree of accuracy, avoiding the drawbacks inherent in mechanically operating shutters heretofore known.

According to the invention a photosensitive means receives light from the object to be photographed and converts the light into a corresponding electrical signal which varies according to a geometric progression. A storing means stores this signal as a voltage which varies according to an arithmetic progression. A logarithmic means is electrically connected with the photosensitive means and the storing means for first transmitting the signal from the photosensitive means to the storing means while converting the signal from one which varies according to a geometric progression into one which varies into an arithmetic progression, and for then taking the signal from the storing means and reconverting it back into a signal which varies according to a geometric progression in precisely the same way that the signal was initially converted when transmitted to the storing means, so that the signal taken from the latter will have precisely the same characteristics as the signal produced by the photosensitive means. An oscillating circuit means is electrically connected with the logarithmic means to be operated with the signal taken from the storing means and converted back into a signal varying according to a geometric progression, and this oscillating circuit means is electrically connected with a shutter-operating means which is actuated by the oscillating circuit means for first opening and then closing a shutter of the camera in accordance with the manner in which the oscillating circuit means is operated with the signal from the storing means.

BRIEF DESCRIPTION OF DRAWINGS

The invention is illustrated by way of example in the accompanying drawings which form part of this application and in which.

DESCRIPTION OF PREFERRED EMBODIMENTS

With the present invention the light from an object which is to be photographed and which varies according to a geometric progression is converted into a voltage which varies according to an arithmetic progression, and then this latter voltage is restored to a voltage which varies according to a geometric progression in precisely the same way as the light from the object to be photographed, this restored voltage being used to operate an oscillating circuit which is then used to control the operation of a camera shutter with this voltage which varies according to a geometric progression. The oscillation circuit thus provides a time control where the oscillating frequency of the oscillating circuit is automatically determined in accordance with the voltage which varies according to a geometric progression.

Thus, the shutter of the camera is electrically operated according to a system where logarithmic conversion takes place and this system is particularly adapted to be used in a camera where through-the-lens light measuring takes place with the light intensity varying according to a geometric progression and being converted to a voltage which varies according to an arithmetic progression, with this latter voltage then being restored to a voltage which varies according to a geometric progression. These latter types of operations are usually brought about by interaction of three cooperating elements, namely, a photosensitive means such as a cadmium sulfide resistor which serves to detect the light coming from the object to be photographed, a logarithmic conversion element such as a diode, and an element for inverse conversion, so that the determination of the exposure time is to a very great degree influenced by the characteristics of these latter elements.

Figure 2:
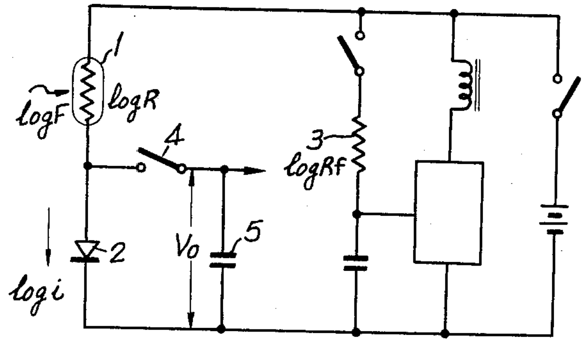
FIG. 2 is a schematic representation of circuitry which operates according to the present invention.

Referring to FIG. 2 which schematically illustrates the present invention, there is illustrated therein a photosensitive means 1 which receives light from the object which is to be photographed, this light being represented by the light value log F. At this photosensitive means 1 there is achieved from this light value an internal resistance value log R which varies in the same way that the light value log F varies, and this serves to produce an electrical current log $i$ which corresponds to and is derived from the light value at the object which is to be photographed. Thus, the light received by the photosensitive means 1 is converted into an electrical signal in the form of the current log i which flows through the diode 2 which is connected in series with the photosensitive means 1. This signal which thus flows through the diode 2 is stored by a capacitor 5 electrically connected in parallel with the diode 2 by a switch 4. This signal from the diode 2 is stored at the capacitor 5 in the form of a voltage $V_o$ which varies according to an arithmetic progression, this latter voltage being stored between the terminals of the capacitor 5. The exposure time is determined by a delay circuit which is controlled in accordance with the variation of the internal resistance log Rf developed in the illustrated resistor 3, this quantity log Rf which develops in element 3 being derived by inverse conversion of the voltage $V_o$ into a voltage which varies in a geometric progression according to the light intensity of the object which is to be photographed, this inverse conversion from the arithmetic progression back into the geometric progression taking place when the voltage $V_o$ stored at the storing means 5 is transmitted to the element 3. Thus, it is essential with an arrangement as illustrated in FIG. 2 for operation of an electric camera shutter where light is measured after having passed through the objective of the camera to maintain a linear characteristic in the relation between log R and log F, between $V_o$ and log $i$, and between $V_o$ and log Rf.

Figure 1:
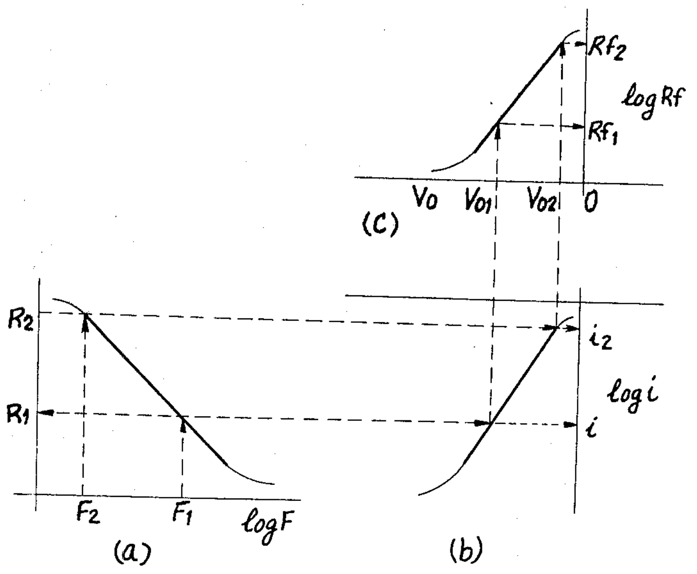
FIG. 1 is a diagrammatic representation of operating curves of various components and the manner in which they are related to each other.

These linear characteristics are illustrated respectively at the interrelated graphs ($a$), ($b$), and ($c$) illustrated in FIG. 1. Referring to the graph ($a$), when the photosensitive means 1 is exposed to a light value $F_1$ from the object to be photographed within the linear range which is illustrated in the heavier solid line, this photosensitive means 1 develops the internal resistance $R_1$, and the electrical current $i_1$, which is regulated by the resistance value $R_1$ flows through the diode 2 which serves as a logarithmic conversion element, with the result that the voltage $V_o$ which varies according to an arithmetic progression develops in the capacitor 5. Thus, the graph ($b$) shows the current log $i$, while the graph ($c$) shows the resulting voltage $V_o$. Graph ($c$) also show how the reconversion element 3 has the internal resistance $Rf_1$, and the graphs of FIG. 1 show by their interrelationship that the relation $R_1 = Rf_1$ is established. The internal resistance $R_1$ of the photosensitive means 1, determined in accordance with the light intensity at the object to be photographed, is thus exactly restored back into the internal resistance value $Rf_1$ at the inverse conversion element 3, so that the electrically operated shutter used with the through-the-lens light measuring system can be operated with proper accuracy by providing a delay circuit for determining the exposure time based upon the resistance value $Rf_1$.

It is to be noted, however, that all of these above operations are achieved only within the linear range of the respective operating characteristics of the above components. The internal resistance value $Rf_2$ of the inverse conversion element 3, which is controlled by $R_2$ and $i_2$ with respect to the light intensity having the value $F_2$ at the object to be photographed is the result of relationships at the non-linear range of the respective characteristic operating curves of the components, and in this case, which is to say when the operations are beyond the linear parts of the curves, the internal resistance value $R_2$ is not accurately restored to a corresponding value at the element 3, so that $Rf_2$ is not precisely equal $R_2$ under these conditions.

Thus, particularly when dealing with shutter operation at particularly high or particularly low speeds, the precise restoration of the signal back into its initial form where it varies according to a geometric progression is difficult to achieve. This restoration is rendered more difficult by the fact that the logarithmic conversion element 2 and the inverse conversion element 3 have different operating characteristics, as in the situation where the logarithmic conversion element is a log diode while the inverse conversion element is a field effect transistor. In addition, when the closing of the shutter at high speed operation is determined by control of the output of a delay circuit which in turn is regulated by the inverse conversion element 3, it is extremely difficult for the leading shutter curtain to be started mechanically for the purpose of opening the shutter at precisely the proper instant, and as a result the exposure time value in seconds inevitably has a substantial error due to the manner in which the shutter is mechanically opened.

In order to avoid the latter problems with an electrically operated shutter in a camera having a through-the-lens light measuring system, there is provided according to the present invention an automatic exposure time control device where the electrically operated shutter is actuated through a conversion mechanism which acts according to the light intensity from the object to be photographed in the manner referred to above. Thus, the circuitry of the invention has an information converter section provided with a logarithmic conversion element regulated by the internal resistance of the photosensitive means in accordance with the information provided by the light intensity at the object to be photographed, and this circuitry also has an inverse conversion element which has precisely the same characteristics as the logarithmic conversion element, thus bringing about restoration of the stored voltage which corresponds to the value of the light intensity to a voltage which varies according to a geometric progression. This is brought about by a logarithmic expansion circuit, and an oscillating circuit means is provided for electrically controlling the shutter operating components, bringing about opening and closing of the shutter with the time controlled by the oscillating circuit means which is regulated by the output from the logarithmic expansion part of the circuit. In the way there is a regulation of the oscillating frequency of the oscillating circuit means.

The circuitry includes an information converter section having the logarithmic conversion element which converts the light intensity of the object to be photographed, which varies according to a geometric progression, into a voltage which varies according to an arithmetic progression and which is stored by the storing means which is formed by the capacitor. The logarithmic expansion circuit, which includes an element of the same characteristics as that of the initial logarithmic conversion element, serves to restore the stored voltage which varies according to an arithmetic progression to a voltage which varies according to a geometric progression and which corresponds precisely to the light intensity of the object to be photographed. Thus, the logarithmic expansion part of the circuit is connected to the output of the information converter section. The oscillating time control circuit serves to control the oscillating frequency in accordance with the signal according to the light intensity of the object to be photographed, this latter signal being obtained by the logarithmic expansion part of the circuit. The output of the oscillating circuit means is then used to control the shutter-operating means, the oscillating circuit means providing a driving signal for bringing about opening and closing of the shutter. The photosensitive means of the information converting section includes a photosensitive element which detects the light intensity of the object to be photographed, and the information converter section also includes the logarithmic conversion element which may be connected to the photosensitive element through a change-over switch means. This latter switch means may be operated, where there is a single diode which functions for the logarithmic conversion, in such a way that the same diode forms the logarithmic expansion part of the circuit and converts the stored voltage which varies according to an arithmetic progression to a voltage by which correspondingly varies according to a geometric progression, this latter voltage corresponding precisely to the light intensity of the object which is to be photographed.

Figure 3:
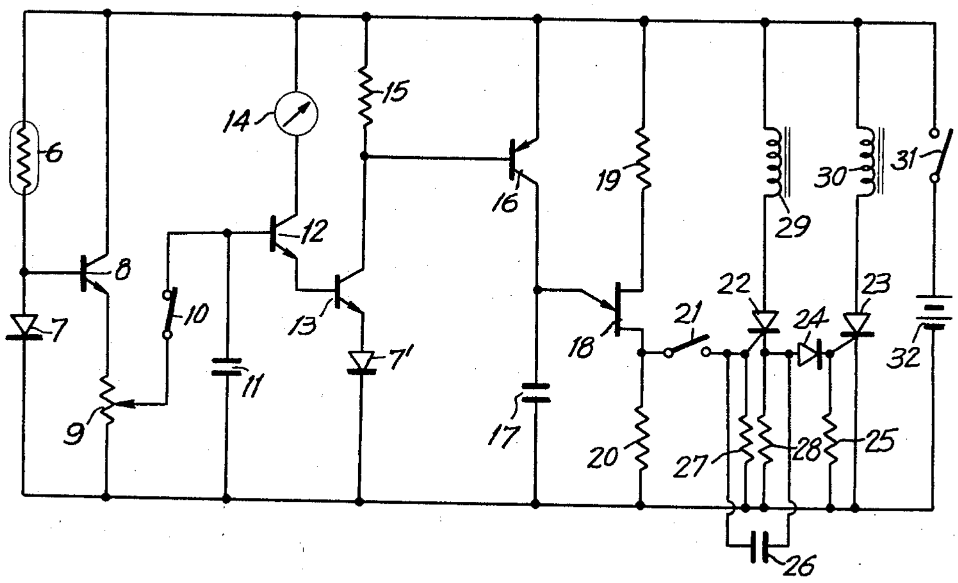
FIG. 3 is a wiring diagram of one possible embodiment of a circuit according to the present invention.
Figure 4:
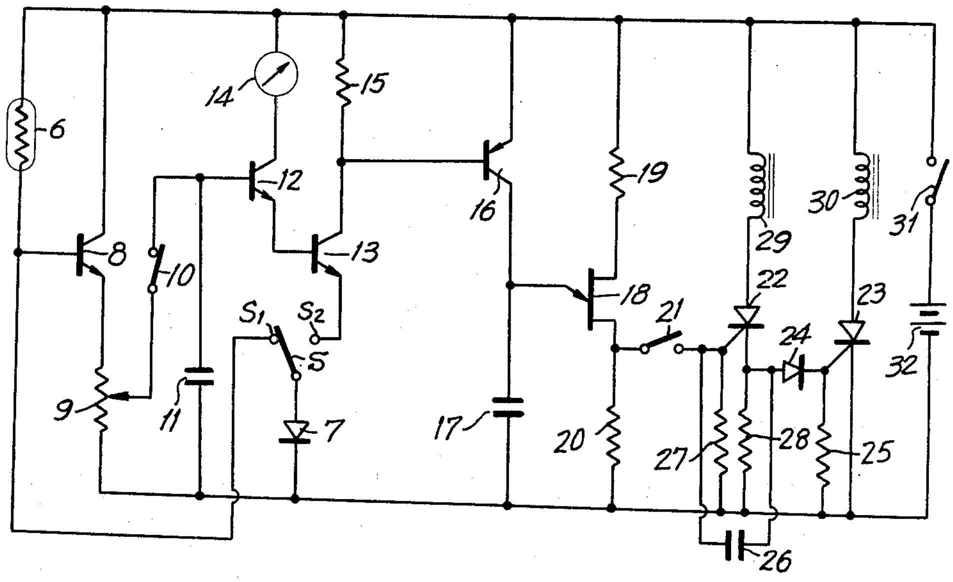
FIG. 4 is a wiring diagram of another possible embodiment of a circuit according to the present invention.
Figure 5:
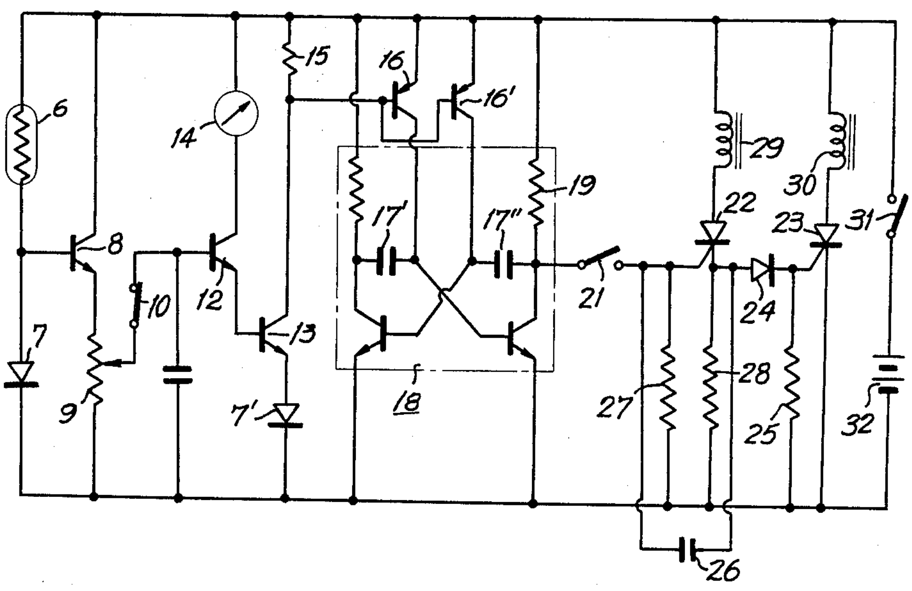
FIG. 5 is a wiring diagram of a further embodiment of a circuit according to the present invention.

These latter features of the invention are shown in detail in FIGS. 3–5 where preferred embodiments of the invention are illustrated.

Referring now to FIG. 3, the illustrated photosensitive means 6 detects the light intensity at the object to be photographed, this light intensity varying according to a geometric progression. A logarithmic means is provided, this logarithmic means including the logarithmic conversion element 7 in the form of a diode which serves to convert the light intensity at the object to be photographed and which varies according to a geometric progression into a voltage which varies according to an arithmetic progression, this diode 7 being connected in series with the photosensitive means 6. A transistor 8 has its base connected to a junction between the series-connected photosensitive means 6 and logarithmic conversion element 7 of the logarithmic means. The bias or continuity transfer level voltage of the transistor 8 is controlled by a variable resistor 9 which may have its resistance value adjusted according to factors such as the aperture at which the diaphragm of the camera is set and the speed of the film which is to be exposed in the camera. Thus, the transistor 8 is regulated by the voltage which varies according to an arithmetic progression. A storing means 11 is provided in the form of a capacitor which serves to store the information according to the light intensity of the object which is to be photographed, with this latter information being stored in the form of a signal which has been converted into the voltage which varies according to an arithmetic progression, the switch 10 being connected between the variable resistor 9 and one pole of the capacitor 11 so that the stored voltage at the capacitor 11 is influenced according to the potential at the variable resistor 9.

The illustrated circuit includes the transistors 12 and 13 the operation of which is controlled by the terminal voltage of the capacitor 11, these transistors 12 and 13 forming a high input impedance. The circuitry includes an indicator 14 for indicating the shutter speed or the like, this indicator being electrically connected to the collector of the transistor 12.

The logarithmic means of the embodiment of FIG. 3 includes in addition to the diode 7 a second diode 7′ which forms the inverse conversion element for restoring the voltage which varies according to an arithmetic progression to the voltage which varies according to a geometric progression and which will correspond to the light intensity at the object to be photographed. In accordance with one of the important features of the invention this element 7′ of the logarithmic means has precisely the same characteristics as the element 7.

The circuitry also includes a transistor 16 the operation of which is regulated by the voltage in accordance with the light intensity of the object to be photographed as applied from a junction between the collector of transistor 13 and a resistor 15 connected in series with this collector. A capacitor 17 is connected in series with the transistor 16 so as to provide in this way an oscillation time control circuit which, in turn, automatically controls the oscillating frequency of the oscillating circuit means of the invention as described below, this control being on the basis of the signal according to the light intensity at the object to be photographed.

The oscillating circuit means includes the unijunction transistor 18 which serves as an oscillating element and which has its oscillating frequency controlled by the time control circuit. The oscillating circuit means includes in addition to the oscillating element 18 the pair of resistors 19 and 20 respectively connected to the electrodes of the oscillating element 18.

A shutter operating means is electrically connected with the oscillating circuit means 18 so as to be driven thereby, and this shutter operating means in the illustrated circuitry includes a current control element 22 such as a thyristor having its positive electrode electrically connected with a relay 29 which serves to bring about the starting of an exposure by releasing the leading shutter curtain so that it will run down to open the shutter. The control electrode of the thyristor 22 is connected through a switch 21 to a junction between the oscillating element 18 and the resistor 20 connected in series with the element 18. In order to control the closing of the shutter the illustrated shutter-operating means includes a second current control element such as a second thyristor which has its positive electrode connected to a relay 30 which when energized starts the running of the trailing curtain which thus closes the shutter and terminates the exposure. The control electrode of the second thyristor 23 is connected with a diode 24 which is in turn connected to the negative terminal of the element 22. A capacitor 26 is inserted between the control electrodes of the tyristors 22 and 23. The circuitry includes a switch 31 which when closed energizes the entire circuit with the energy derived from a power source such as the illustrated battery 32.

With the embodiment of the invention which is illustrated in FIG. 4, the photosensitive means 6 and the logarithmic means, which in this case is formed only by a single diode 7, are connected in series through a changeover switch means S when this latter switch means is electrically connected with the contact $S_1$. The logarithmic expansion part of the circuit is formed by changing over the switch means S to engage the contact $S_2$, after the signal from the photosensitive means 6 has been stored by the storing means 11. Except for this difference according to which a single diode of the logarithmic means of FIG. 4 replaces the pair of diodes of the logarithmic means of FIG. 3, the circuitry of FIG. 4 is identical with that of FIG. 3 and thus all of the components are designated by the same reference characters.

The embodiment of the invention which is illustrated in FIG. 5 is similar to that of FIG. 3 except for the structure of the oscillating circuit means 18. Thus, in the case of FIG. 5 the oscillating circuit means 18 takes the form of a multivibrator of the self-drive type, this multivibrator operating to achieve the same functions as that of oscillating element 18 of FIG. 3.

The above embodiments of FIGS. 3–5 operate in the following manner:

Referring to FIG. 3, when the switch 31 is closed and the photosensitive means 6 is directed toward the object which is to be photographed, the internal resistance of the photosensitive means 6 varies in accordance with the light intensity at the object to be photographed. Thus, an electric current flows through the logarithmic conversion element 7 in accordance with the variation of the resistance value of the photosensitive means 6, so that the variation of the light intensity at the object to be photographed, which varies according to a geometric progression, is converted by element 7 into a voltage which varies according to an arithmetic progression. After this voltage has been regulated by the exposure factors as determined by the transistor 8 and the variable resistor 9, the signal of the light intensity at the object to be photographed which has thus been converted into a voltage which varies according to an arithmetic progression is stored at the capacitor 11 which forms the storing means. This capacitor 11, however, is electrically connected to the input of the high input impedance circuit which includes the transistors 12 and 13, so that the voltage $V_o$ which varies according to an arithmetic progression between the terminals of the capacitor 11 is directly applied to the inverse conversion element 7' of the logarithmic means as the emitter follower voltage $V_o'$ of the high input impedance circuit. It is to be noted that the inverse conversion element 7' is chosen so as to have precisely the same characteristics as the logarithmic conversion element 7. Thus there is established a relation between the current $i$ flowing through the inverse conversion element 7' and the emitter follower voltage $V_o'$ so that $V_o' = \log i$. Consequently, the relationship $i = 10\ V_o'$ is obtained, and the voltage gain of the inverse conversion element 7' has a value nearly equal to 1 because of its emitter follower characteristic. Thus, the voltage $V_o$ which varies according to an arithmetic progression and is stored at the capacitor 11 corresponds the emitter follower voltage $V_o'$, with $V_o = V_o'$, and the electrical current $i$ flowing through the inverse conversion element 7' in the logarithmic expansion circuit is determined according to the relation $i = 10\ V_o$. The result is that the signal according to the light intensity of the object to be photographed converted by the information converter section from the light intensity which varies according to a geometric progression into the voltage which varies according to an arithmetic progression is accurately restored to the voltage varying according to a geometric progression in accordance with the light intensity of the object to be photographed. The voltage output of the logarithmic expansion part of the circuit varies thus according to a geometric progression and is obtained in the manner described above, and this voltage is utilized to control the operation of the transistor 16 which serves as a resistor of the oscillating circuit means. The internal resistance of the transistor 16 is controlled in accordance with the voltage which varies according to a geometric progression as determined by the light intensity of the object to be photographed. This transistor 16 together with the capacitor 17 serve as a time-control for the following stage to determine automatically the oscillating frequency of the oscillating circuit means, so that in this way there is produced a series of pulses varying according to a geometric progression.

During the initial operations the switch 10 is of course closed. However, when the mirror of the camera swings up just prior to exposure of the film, the switch 10 is opened by this upward swinging movement of the camera mirror, so as to avoid any undesirable influence on the oscillating frequency of the oscillating circuit means, and at the same time the switch 21 is closed in synchronism with the depression of the shutter button. The result is that the first element 22 of the shutter-operating means is fired with the first pulse which forms the output from the oscillating circuit means, and this results in energizing of the relay 29 so as to release in a well known manner the leading shutter curtain which thus brings about instantaneous opening of the shutter. The diode 24 is connected in a forwardly biased manner to the control electrode of the second control element 23 of the shutter-operating means.

When the second pulse of the oscillating circuit means reaches the diode 24 through the capacitor 26, the element 23, which previously was in a non-conductive state, is transferred to its conductive state so as to be fired and instantaneously energize relay 30, thus releasing the trailing shutter curtain which now instantaneously closes the shutter and terminates the exposure. In this way all of the operations in connection with exposure of film in the camera are completed.

With respect to the circuitry of the invention illustrated in FIG. 4, when the photosensitive means is directed to the object to be photographed with the changeover switch S engaging the contact $S_1$, the voltage which varies according to an arithmetic progression, as derived from the light intensity of the object to be photographed, is stored at the capacitor 11 in the form of a signal in accordance with the light intensity of the object to be photographed. The change-over switch means S is changed over to the contact $S_2$ after the storing operation has been completed and closes the logarithmic expansion circuit which restores the voltage stored according to an arithmetic progression at the capacitor into a voltage which varies according to a geometric progression and corresponds to the signal in accordance with the light intensity of the object to be photographed. This changing over of the switch S from the contact $S_1$ to the contact $S_2$ takes place in synchronism with the opening of the switch 10, so that in this way it will be seen that the single diode 7 of FIG. 4 performs the functions of both of the diodes 7 and 7' of FIG. 3 which have the same operating characteristics.

Then with the embodiments of FIG. 4 the oscillating circuit means which includes the transistor 16 and the capacitor 17 is actuated in accordance with the control provided by the output of the expansion circuit so that the oscillating circuit means will drive the shutter-operating means to open and close the shutter in accordance with the signal according to the intensity of light at the object which is to be photographed. In this way the embodiment of FIG. 4 will achieve the same results as that of FIG. 3.

With the circuitry illustrated in FIG. 5, the multivibrator 18 of the self-drive type is used in place of the oscillating element 18 of FIG. 3. The oscillating frequency T obtained by the vibrator 18 is generated by the capacitors 17' and 17'' which have the same capacitance value C incorporated into the multivibrator 18. It is well known that in this way there is established a relation as expressed by $T = 1.4\ RC$ where R designates the internal resistance value which is common to the transistors 16 and 16' which are controlled by the signal according to the light intensity of the object to be photographed as obtained from the expansion circuit. The oscillating frequency T controls the elements 22 and 23 of the shutter-operating means so as to fire these elements with the interval between the firing of the elements being determined in accordance with the oscillating frequency to bring about the opening and closing of the shutter precisely as described above in connection with FIG. 3.

Thus, with the structure according to the present invention, the logarithmic means includes the logarithmic conversion element 7 and the logarithmic expansion, inverse conversion element 7' which have precisely the same characteristics in the embodiments of FIGS. 3 and 5. Thus, the information in accordance with the light intensity of the object to be photographed, which varies according to a geometric progression, is converted into a voltage which varies according to an arithmetic progression, and this latter voltage is then reconverted back into the voltage varying according to a geometric progression by the inverse conversion element 7' of the logarithmic expansion circuit, this latter element having the same characteristics as the conversion element 7. In this way an extremely high degree of precision is achieved to provide the voltage varying according to a geometric progression at the output of the logarithmic expansion part of the circuit according to the light intensity of the object to be photographed.

The arrangement is such that the conversion element 7 and the inverse conversion element 7' have the same characteristics, and this arrangement is of particular advantage in that the linear characteristics of these elements are maintained during operation of the logarithmic conversion or logarithmic expansion, with the information according to the light intensity of the object to be photographed converted directly into the information of a voltage which varies according to a geometric progression to provide the required signal for operating the shutter, and the time required for the speed of operation of the shutter, to determine the exposure time, is achieved with a high degree of precision over a very large range.

The concept of using the signal according to the light intensity at the object to be photographed with a high degree of precision at the logarithmic expansion circuit as an input for the time control circuit in order to control the frequency of oscillation of the oscillating circuit means is highly advantageous in that the oscillating frequency of the oscillating circuit may be reliably converted into the frequency which varies according to the geometric progression under the control of the time control circuit which is in turn regulated by the information according to the light intensity of the object to be photographed which has now been converted into the voltage which varies according to the geometric progression, and the determination of the speed of operation for the shutter so as to determine the exposure time is thus controlled by this frequency with a high degree of precision.

In addition, the arrangement according to which both the opening and the closing of the shutter are brought about under the control of the oscillating circuit means which in turn is under the control of the oscillating time control circuit eliminates erroneous or inaccurate operation which has inevitably been encountered upon opening of the shutter with prior arrangements which operate in a purely mechanical manner, and as a result a highly stable and reliable shutter speed is achieved with a high degree of precision over a wide range of speeds.

Finally, the arrangement according to which the photosensitive means 6 for detecting the light intensity and the conversion of element 7 are connected to each other in series through the change-over switch means S, with the logarithmic expansion circuit being formed by this changeover switch means after the information has been stored is particularly advantageous in that a single conversion element forms the logarithmic means and is thus used both for logarithmic compression in transmitting the signal to be stored to the capacitor and logarithmic expansion in transmitting the signal from the capacitor, so that an extremely precise restoration of the stored signal to one which varies according to a geometric progression is achieved, and at the same time substantial advantages are achieved in the manufacture of the structure in connection with efficiency in assembly or in the production of the device.

Thus, the device according to the present invention used in the electrical control of a camera shutter of the frequency conversion type with a through-the-lens light measuring system is extremely effective and efficient as a practical matter, and this structure of the invention is of particular significance in bringing about a practical and useful electrically controlled shutter capable of operating with a high degree of precision.

What is claimed is:

1. In a camera, photosensitive means for receiving the light from an object which is to be photographed and for converting the received light into a corresponding electrical signal which varies according to a geometric progression, storing means for storing the latter signal as a voltage which varies according to an arithmetic progression, logarithmic means electrically connected with said photosensitive means and storing means for converting the signal from said photosensitive means which varies according to a geometric progression into a signal which varies according to an arithmetic progression and which is stored as said voltage by said storing means and for reconverting the stored signal at said storing means back into a signal which varies according to a geometric progression, said logarithmic means coacting with said photosensitive means and with said storing means for converting the signal stored at the latter back into a signal varying according to a geometric progression in precisely the same way that the signal was initially converted when transmitted by said logarithmic means from said photosensitive means to said storing means, so that the signal taken from the storing means corresponds precisely to the signal produced by said photosensitive means with the light received thereby, oscillating circuit means electrically connected with said logarithmic means to be operated by the latter for providing pulses at a frequency determined by the signal derived from said storing means by said logarithmic means, and shutter-operating means electrically connected to said oscillating circuit means to be driven thereby for first opening and then closing a shutter in accordance with the operation of said oscillating circuit means by said logarithmic means with the signal derived from said storing means.

2. The combination of claim 1 and wherein said storing means is a capacitor.

3. The combination of claim 1 and wherein said logarithmic means includes a pair of diodes one of which is electrically connected between said photosensitive means and said storing means and the other of which is electrically connected between said storing means and said oscillating circuit means, said pair of diodes having the same characteristics.

4. The combination of claim 1 and wherein said logarithmic means includes a single diode and a switch means electrically connected therewith for connecting said single diode first between said photosensitive means and storing means and then between said storing means and oscillating circuit means.

5. The combination of claim 1 and wherein said shutter-operating means includes a pair of relays for respectively opening and closing a shutter, a pair of thyristors electrically connected with said relays for respectively actuating the latter, and electrical means electrically interconnecting said oscillating circuit means and said pair of thyristors for respectively firing the latter with an interval between the firing thereof determined by the operation of said oscillating circuit means with the signal transmitted to the latter from said storing means by said logarithmic means.

6. The combination of claim 5 and wherein said oscillating circuit means includes a unijunction transistor.

7. The combination of claim 5 and wherein said oscillating circuit means includes a multivibrator.

* * * * *